US007961261B2

(12) United States Patent
Ishii et al.

(10) Patent No.: US 7,961,261 B2
(45) Date of Patent: Jun. 14, 2011

(54) IMAGE FORMING APPARATUS

(75) Inventors: Tsutomu Ishii, Ebina (JP); Naoki Hiji, Ebina (JP); Yasunori Saito, Ebina (JP); Masahiro Sato, Ebina (JP); Shigehiko Sasaki, Ebina (JP); Kyotaro Tomoda, Ebina (JP); Kimitake Hasuike, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 400 days.

(21) Appl. No.: 12/174,454

(22) Filed: Jul. 16, 2008

(65) Prior Publication Data

US 2009/0103946 A1 Apr. 23, 2009

(30) Foreign Application Priority Data

Oct. 23, 2007 (JP) ................................ 2007-275699

(51) Int. Cl.
*G02F 1/135* (2006.01)

(52) U.S. Cl. ............................................ 349/25; 349/2

(58) Field of Classification Search ................ 349/2, 12, 349/160; 347/118, 129, 130; 345/81
See application file for complete search history.

(56) References Cited

U.S. PATENT DOCUMENTS

| | | | | |
|---|---|---|---|---|
| 7,576,760 | B2 * | 8/2009 | Koshimizu et al. | ........... 345/695 |
| 2005/0162500 | A1 | 7/2005 | Nose et al. | |

FOREIGN PATENT DOCUMENTS

WO WO 2004/068230 A1 8/2004

* cited by examiner

*Primary Examiner* — David Nelms
*Assistant Examiner* — David Y Chung
(74) *Attorney, Agent, or Firm* — Oliff & Berridge, PLC

(57) ABSTRACT

An image forming apparatus comprises: a holding unit that holds a medium on which an image is formed by irradiation of image-bearing light, the medium having a liquid crystal layer, a photoconductor layer that changes a resistance in response to irradiation of light, and a pair of electrode layers provided in an opposing relation so as to sandwich the liquid crystal layer and photoconductor layer, with at least one of the pair of electrode layers being divided into stripe-shaped sub-electrode layers; an irradiating unit that irradiates the medium with image-bearing light linearly along a longitudinal direction of the sub-electrode layers; a transporting unit that transports the irradiating unit along the surface of the medium in a first or second direction; a power supply unit that applies a voltage between the sub-electrode layer and the electrode layer; and an optical shielding unit that shields the photoconductor layer.

8 Claims, 7 Drawing Sheets

IMAGE FORMING APPARATUS

CROSS-REFERENCE TO RELATED APPLICATIONS

This application is based on and claims priority under 35 U.S.C. 119 from Japanese Patent Application No. 2007-275699, which was filed on Oct. 23, 2007.

BACKGROUND

1. Technical Field

The present invention relates to an image processing apparatus.

2. Related Art

A technology exists in which a medium, to which a voltage is applied, is irradiated with image-bearing light, thereby carrying out image formation on the medium, as well as erasure of images formed on the medium.

SUMMARY

In an aspect of the invention, there is provided an image forming apparatus comprising: a holding unit that holds a medium on which an image is formed by irradiation of image-bearing light, the medium having a liquid crystal layer, a photoconductor layer that changes a resistance in response to irradiation of light, and a pair of electrode layers provided in an opposing relation so as to sandwich the liquid crystal layer and photoconductor layer, with at least one of the pair of electrode layers being divided into a plurality of stripe-shaped sub-electrode layers; an irradiating unit that irradiates, from a position opposite the holding unit with respect to the medium, the medium with image-bearing light linearly along a longitudinal direction of the plurality of sub-electrode layers of the medium held by the holding unit; a transporting unit that transports the irradiating unit along the surface of the medium held by the holding unit in a first direction transverse to the longitudinal direction of the linear light radiated by the irradiating unit or in a second direction opposite to the first direction; a power supply unit that, while the light radiated by the irradiating unit irradiates the photoconductor layer contacting one of the plurality of sub-electrode layers of the medium held by the holding unit, applies a voltage between the sub-electrode layer and the electrode layer positioned corresponding to the sub-electrode layer; and an optical shielding unit that, while the light radiated by the irradiating unit irradiates the photoconductor layer contacting one of the plurality of sub-electrode layers of the medium held by the holding unit, shields the photoconductor layer contacting said sub-electrode layer from external light.

BRIEF DESCRIPTION OF THE DRAWINGS

Exemplary embodiments of the present invention will be described in detail based on the following figures, wherein.

DETAILED DESCRIPTION

1. Exemplary Embodiment

Figure 1:
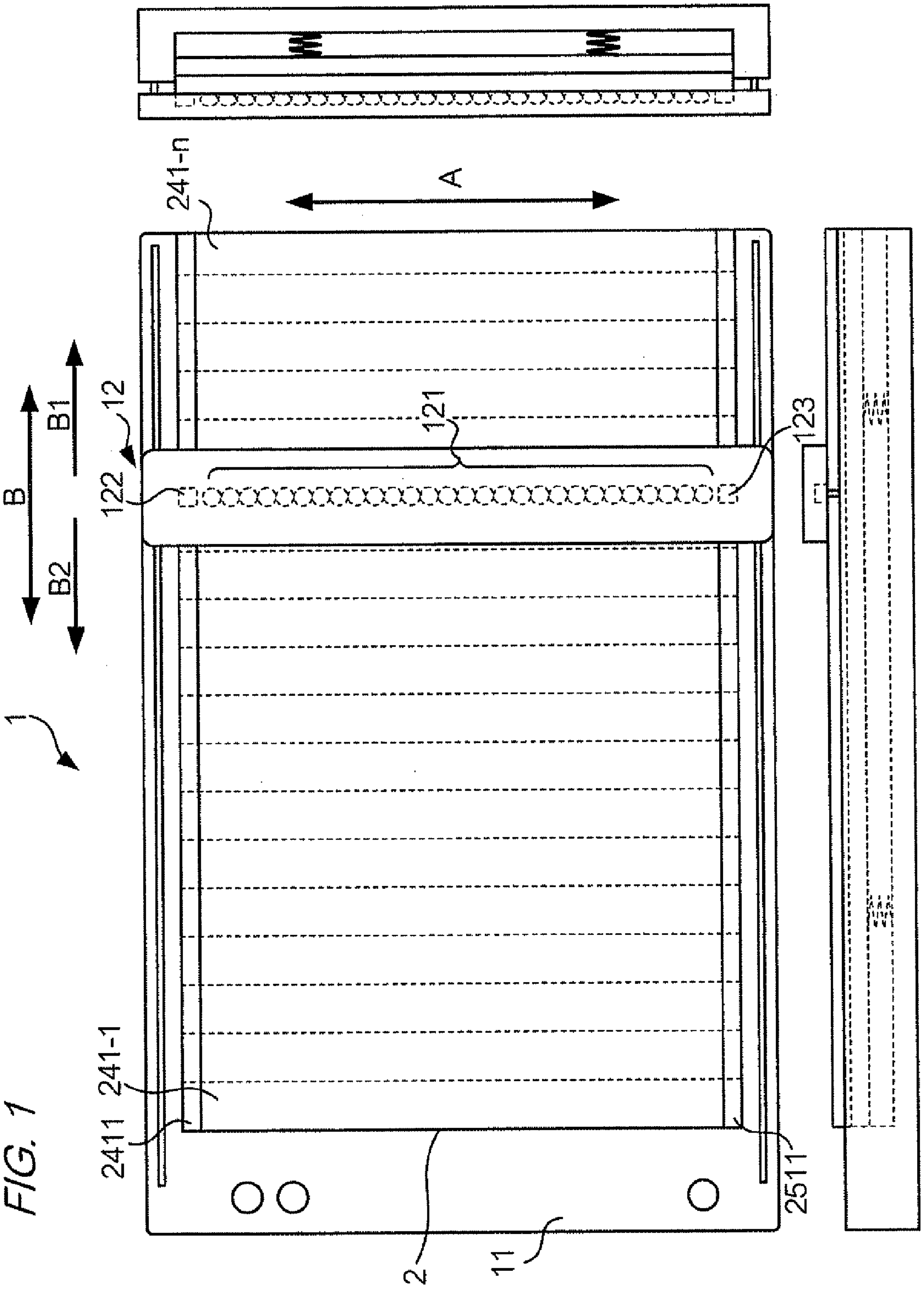
FIG. 1 is an outside view of an image forming apparatus used in an exemplary embodiment of the present invention.

An exemplary embodiment of the present invention is explained below. FIG. 1 is an outside view of an image forming apparatus used in an exemplary embodiment of the present invention. As shown in FIG. 1, multiple pieces of planar-shaped medium 2, on which images are formed, are loaded into the image forming apparatus 1 as a stack. The image forming apparatus 1 comprises an enclosure 11 and a photo-irradiating bar 12. The enclosure 11 comprises a recessed area (holding unit), into which the multiple pieces of medium 2 can be loaded as a stack, such that media 2 is held inside the image forming apparatus 1. Furthermore, it is constructed such that the bottom of the recessed area provided in the enclosure 11 is continuously upwardly urged by springs etc. so as to push the loaded media 2 upward.

When the media 2 is loaded into the enclosure 11, the photo-irradiating bar 12 is located in a position facing the enclosure 11, with the media 2 sandwiched in between. On the side facing the media 2 loaded into the enclosure 11, the photo-irradiating bar 12 has an LED array 121 having multiple LEDs (Light Emitting Diodes) arranged in a linear fashion and lenses condensing the light radiated from the LEDs and transmitting the light towards the media 2. It should be noted that, instead of the LED array 121, the photo-irradiating bar 12 may have laser ROS (Raster Output Scanners) or semiconductor lasers arranged in a linear fashion. In the following explanations, the longitudinal direction of the photo-irradiating bar 12, i.e. the direction of the two arrows A in FIG. 1, is referred to as the “main direction”, and the direction transverse to the main direction, i.e. the direction of the two arrows B in FIG. 1, is referred to as the “auxiliary direction”.

In addition, on the side facing the media 2 loaded into the enclosure 11, the photo-irradiating bar 12 has a terminal 122 and a terminal 123. The positions of the terminal 122 and terminal 123 are slightly on the inside of the positions of intersection between extensions of the line formed the LEDs of the LED array 121 and each of the two sides of the media 2 loaded into the enclosure 11, which extend in the auxiliary direction.

The photo-irradiating bar 12 placed in contact with the media 2 is made up of a material that does not transmit light. In this manner, the portion of the media 2 loaded into the enclosure 11 that is covered by the photo-irradiating bar 12 can be shielded from external light. The length of the photo-irradiating bar 12 in the auxiliary direction is 2L.

Figure 2:
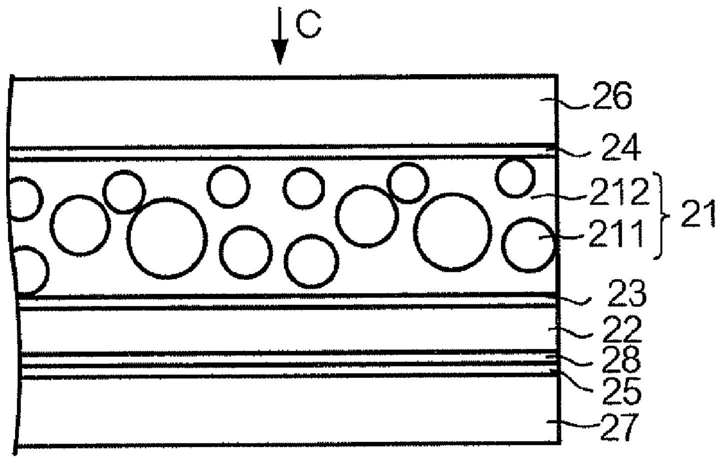
FIG. 2 is a diagram illustrating the structure of a medium, on which the image forming apparatus of the exemplary embodiment of the present invention forms images.

FIG. 2 is diagram illustrating the structure of the media 2. The media 2 has a structure, in which a liquid crystal layer 21 and a photoconductor layer 22 placed in contact with the liquid crystal layer 21, which have a laminate layer 23 interposed therebetween, are sandwiched between a planar electrode 24 and an electrode 25. It should be noted that the electrode 24 is placed on the side of the liquid crystal layer 21 and the electrode 25 is placed on the side of the photoconductor layer 22.

The liquid crystal layer 21 is made up of multiple microcapsules 211 encapsulating cholesteric liquid crystals and a binder 212 holding the microcapsules 211 in the liquid crystal layer 21. Because the media 2 contains liquid crystals encapsulated in this manner in the microcapsules 211, the molecular alignment of the liquid crystals is not prone to be disturbed even if the media 2 is bent, and accordingly the formed image is not prone to distortion. It should be noted that the binder 212 is, for instance, a polymer layer. The photoconductor layer 22 is a layer of electrically conductive material possessing the property of changing its resistance value when subjected to irradiation with light, e.g. a layer of an organic photoconductor whose resistance value decreases under photo-irradiation. Of the electrode 24 and electrode 25, at least the electrode 24, which is placed on the side of the liquid crystal layer 21, is a transparent electrode. Accordingly, the liquid crystal layer 21 may be irradiated with light in the direction of arrow C of FIG. 2 while a user may visually confirm the formation and erasure of images in the direction of arrow C.

On the outside of the electrode 24 and electrode 25, there are arranged a substrate 26 and a substrate 27, which maintain the shape of the media 2. Of the substrate 26 and substrate 27, at least the substrate 26, which is placed on the side of the liquid crystal layer 21, is transparent. The substrate 26 and substrate 27 are, for instance, PET (Polyethylene terephthalate) substrates. Moreover, a black layer 28, which does not transmit light, is provided between the photoconductor layer 22 and the electrode 25. Light that passes through the liquid crystal layer 21 is absorbed by the black layer 28. This is why the portion of the media 2, in which the liquid crystal layer 21 allows light to pass through, appears black to the user. By contrast, the portion, in which the liquid crystal layer 21 reflects light, appears to the user to have the color of the light reflected by the liquid crystal (assumed to be white hereinbelow). It should be noted that if the electrode 25 is a transparent electrode, the black layer 28 may be placed between the electrode 25 and substrate 27. Furthermore, if the electrode 27 is transparent, the black layer 28 may be placed on the outside of the substrate 27.

The structure of the electrode 24 and electrode 25 will be further explained with reference to FIG. 1. The electrode 24 is divided into multiple stripe-shaped sub-electrodes 241 extending in the longitudinal direction of the photo-irradiating bar 12. The sub-electrodes 241 are electrically insulated from one another. It should be noted that, in the following explanations, the multiple sub-electrodes 241 are referred to as sub-electrode 241-1, sub-electrode 241-2, . . . , sub-electrode 241-*n* (where "n" is the total number of the sub-electrodes 241) whenever it is necessary to distinguish between the multiple sub-electrodes 241. In FIG. 1, the sub-electrodes 241 are placed along rectangular locations, into which the media 2 is divided by the dotted lines, and are arranged, starting from the left side, in the order of sub-electrode 241-1, sub-electrode 241-2, sub-electrode 241-*n*. It should be noted that the length of the sub-electrodes 241 in the auxiliary direction is L.

Unlike the electrode 24, the electrode 25 is not divided into multiple sub-electrodes and covers the entire surface of the media 2. It should be noted that, in the same manner as the electrode 24, the electrode 25 may be adapted to be divided into multiple sub-electrodes. However, in such a case, it is necessary that the mutually opposed sub-electrodes is of the same shape and of the same size. Moreover, a configuration may be used, in which the electrode 25 is divided into multiple sub-electrodes and the electrode 24 covers the entire surface of the media 2.

Linear-shaped terminals 2411-1 to 2411-*n*, as well as the terminals 2511, are provided in the edge portions along the two sides of the media 2 extending in the auxiliary direction. When the terminal 122 of the photo-irradiating bar 12 is in contact with the media 2 loaded into the enclosure 11, the sub-electrode 241-1 to sub-electrode 241-*n* come into electrical communication with a power supply unit 16 (not shown) connected to the terminal 122 via the terminal 2411-1 to terminal 2411-*n*. Moreover, when the terminal 123 of the photo-irradiating bar 12 is in contact with the media 2 loaded into the enclosure 11, the electrode 25 comes into electrical communication with the power supply unit 16 connected to the terminal 123 via the terminal 2511.

Figure 8:
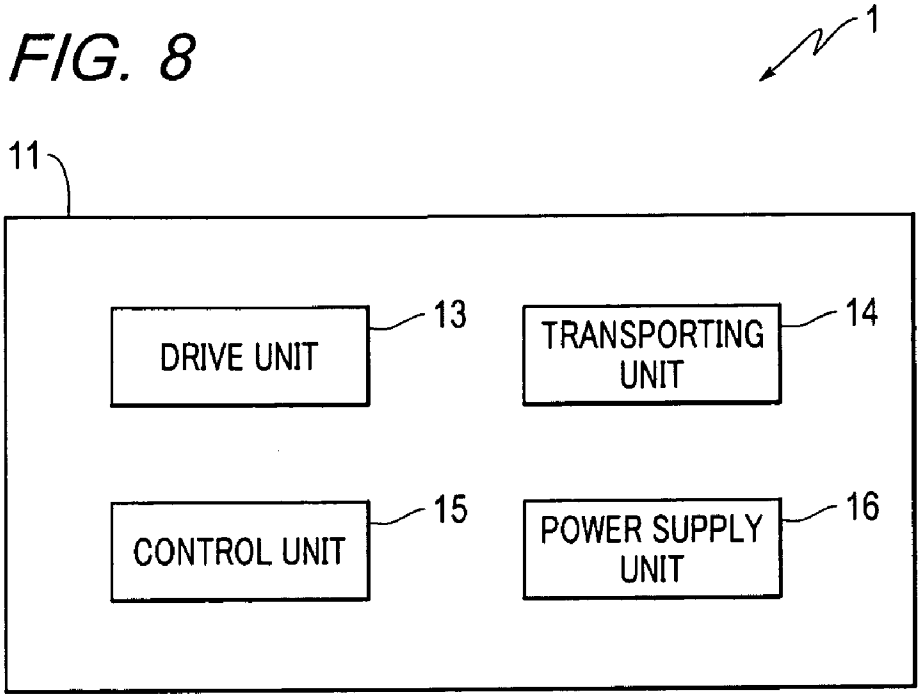
FIG. 8 is an inside view of an image forming apparatus used in an exemplary embodiment of the present invention.

Further explanations will be now provided regarding the configuration of the image forming apparatus 1. As shown in FIG. 8, inside the enclosure 11, there are provided a drive unit 13, which selectively applies voltage to the terminals of the multiple LEDs belonging to the LED array 121 of the photo-irradiating bar 12, a transporting unit 14, which transports the photo-irradiating bar 12 in the auxiliary direction, a control unit 15, which controls the drive unit 13 and transporting unit 14, and a power supply unit 16, which is connected to the terminal 122 and terminal 123 and applies a direct current voltage between the electrode 24 and electrode 25 via the terminal 122 and terminal 123.

The control unit 15 receives image data from an external data processor, such as a PC (Personal Computer), etc., and, by controlling the drive unit 13 in accordance with the received image data, selectively causes the multiple LEDs of the LED array 121 to carry out photo irradiation. At the same time, controlling the transporting unit 14, causes the photo-irradiating bar 12 to move at a constant speed from the right-hand position in FIG. 1 in the direction of arrow B2.

Moreover, the control unit 15 receives image erasure commands from a PC, etc., and, by controlling the drive unit 13, causes the multiple LEDs of the LED array 121 to carry out uniform photo irradiation with light of a predetermined intensity. At the same time, controlling the transporting unit 14, causes the photo-irradiating bar 12 to move at constant speed from the left-hand position in FIG. 1 in the direction of arrow B1.

Due to the motion of the photo-irradiating bar 12, the terminal 122 of the photo-irradiating bar 12 consecutively comes into contact with the terminal 2411-*n*~terminal 2411-1, as a result of which a direct current voltage is applied by the power supply unit 16 between the electrode 25 and sub-electrodes 241 connected to the terminals 2411 contacted by the terminal 122. Here, the polarity of the direct current voltage applied between the electrode 25 and sub-electrodes 241 by the power supply unit 16 is positive while the photo-irradiating bar 12 moves from the right-hand position in FIG. 1 in the direction of arrow B2 and negative while the photo-irradiating bar 12 moves from the left-hand position in FIG. 1 in the direction of arrow B1. It should be noted that the opposite polarities may be used as well.

In the image forming apparatus 1, the polarity of the direct current voltage applied by the power supply unit 16 varies depending on the direction, in which the photo-irradiating bar 12 is transported. This is done to alleviate a problem of cholesteric liquid crystal degradation, which rapidly progresses if a direct current voltage of the same polarity is applied on a constant basis. Accordingly, if degradation of the cholesteric liquid crystals need not be taken into consideration, a configuration may be used, in which a direct current voltage of the same polarity is applied by the power supply unit 16 regardless of the direction, in which the photo-irradiating bar 12 is transported. Moreover, the voltage applied by the power supply unit 16 is not limited to the above-mentioned direct current voltage, and an alternating current voltage may be used as well.

While the photo-irradiating bar 12 moves from the right-hand position in FIG. 1 in the direction of arrow B2, the magnitude of the direct current voltage applied between the electrode 25 and sub-electrodes 241 by the power supply unit 16 is an image formation voltage (described below), and while the photo-irradiating bar 12 moves from the left-hand position in FIG. 1 in the direction of arrow B1, it is a reset voltage (described below), which is higher than the image formation voltage. It should be noted that the photoconductor layer 22 of the position in contact with the sub-electrodes 241, in which the application of the voltage is carried out, is covered by the photo-irradiating bar 12 while the application is carried out, and is not exposed to external light.

Figure 3A:
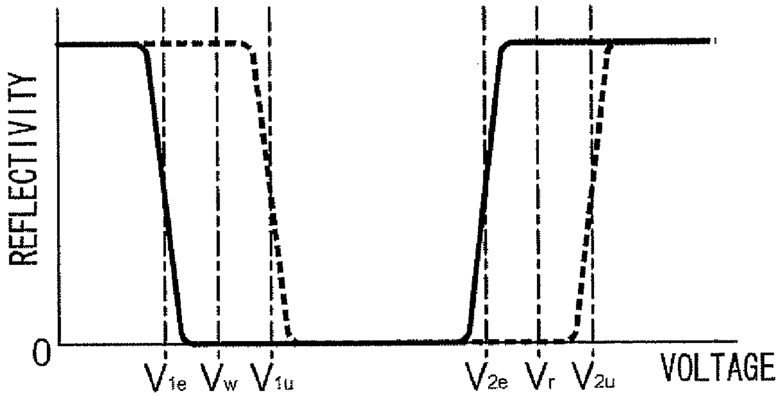
FIGS. 3A and 3B are graphs illustrating the properties of cholesteric liquid crystals contained in the medium, on which the image forming apparatus of the exemplary embodiment of the present invention forms images.
Figure 3B:
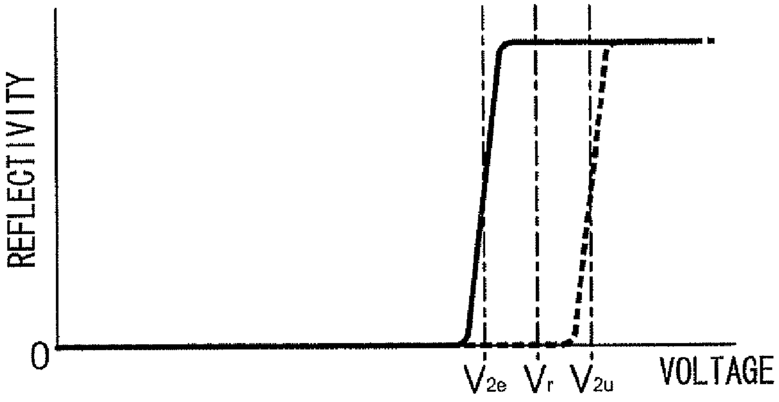

The mechanism of image formation on the media 2 by the image forming apparatus 1 of the above-described configuration is explained below. FIGS. 3A and 3B are graphs illustrating the relationship between the voltage applied between the electrode 24 and electrode 25 and the reflectivity for incident light in the direction of the electric field of the cholesteric liquid crystals encapsulated in the microcapsules 211 sandwiched between the electrode 24 and electrode 25.

The cholesteric liquid crystals have three alignment states including a planar alignment (hereinafter referred to as the "P-alignment"), in which, in response to an applied voltage, the axis of the helix described by the director of the cholesteric liquid crystals becomes nearly parallel to the direction of the electric field and the reflectivity for incident light is high; a focal-conic alignment (hereinafter referred to as the "F-alignment"), in which the axis of the helix becomes nearly perpendicular to the direction of the electric field and the reflectivity for incident light is low; and a homeotropic alignment (hereinafter referred to as the "H-alignment"), in which the director is aligned with the direction of the electric field. Among these alignment states, the P-alignment and F-alignment remain stable even if the voltage is no longer applied, i.e. they possess memory properties. It should be noted that the H-alignment is not stable. If voltage application is abruptly stopped, this alignment transitions to a P-alignment, and if it is stopped smoothly, this alignment transitions to an F-alignment, after which it becomes stable.

FIG. 3A shows the relationship between the applied voltage and the reflectivity of the cholesteric liquid crystals after stopping voltage application in a situation, in which a voltage is applied between the electrode 24 and electrode 25 and then voltage application is abruptly stopped in a case, in which the cholesteric liquid crystals inside the microcapsules 211 exhibit a P-alignment when no voltage is applied between the electrode 24 and electrode 25. In FIG. 3A, the dotted line shows the relationship between voltage and reflectivity in a case, in which the photoconductor layer 22 is not irradiated with light. The solid line shows the relationship between voltage and reflectivity in a case, in which the photoconductor layer 22 is irradiated with light of a predetermined intensity.

When there is no photo-irradiation, increasing the voltage causes the P-aligned cholesteric liquid crystals to transition to an F-alignment in the vicinity of voltage $V_{1u}$ as a threshold value. Subsequently, the F-aligned cholesteric liquid crystals transition to an H-alignment in the vicinity of voltage $V_{2u}$ as a threshold value. The changes in the state of alignment of the cholesteric liquid crystals associated with the increase in voltage in the presence of photo irradiation are similar to those occurring without photo irradiation, but the threshold voltage value causing a transition from the P-alignment to the F-alignment, as well as the threshold voltage value causing a transition from the F-alignment to the H-alignment, are relatively lower than in the absence of photo irradiation. In other words, these threshold voltage values are respectively at voltage $V_{1e}$ (where $V_{1e}<V_{1u}$) and voltage $V_{2e}$ (where $V_{2e}<V_{2u}$). This is due to the fact that while the voltage between the electrode 24 and electrode 25 is constant, the resistance value of the photoconductor layer 22 decreases because of the photo irradiation and, as a result, the voltage applied to the cholesteric liquid crystals contained in the liquid crystal layer 21 increases.

FIG. 3B shows the relationship between the applied voltage and the reflectivity of the cholesteric liquid crystals after stopping voltage application in a situation, in which a voltage is applied between the electrode 24 and electrode 25 and then voltage application is abruptly stopped in a case, in which the cholesteric crystals inside the microcapsules 211 exhibit an F-alignment when no voltage is applied between the electrode 24 and electrode 25. In FIG. 3B, the dotted line shows the relationship between voltage and reflectivity in a case, in which the photoconductor layer 22 is not irradiated with light. The solid line shows the relationship between voltage and reflectivity in a case, in which the photoconductor layer 22 is irradiated with light of a predetermined intensity.

As shown in FIG. 3B, the cholesteric liquid crystals, which are F-aligned when the voltage is zero, maintain their F-alignment until the voltage reaches a voltage threshold value causing a transition from the F-alignment to an H-alignment at a voltage of $V_{2u}$ (in the absence of photo irradiation) or at a voltage of $V_{2e}$ (in the presence of photo irradiation), and then transition to an H-alignment. The voltage threshold value in the presence of photo irradiation is lower than the voltage threshold value in the absence of photo irradiation, which is the same as in a case of increasing voltage starting from a P-aligned state.

When voltage application is stopped within a short period of time after uniform photo irradiation in a state, in which a voltage $V_r$ (where $V_{2e}<V_r$) is applied to the medium 2, all of the cholesteric liquid crystals of the media 2 transition to a P-alignment and stabilize. Accordingly, the entire surface of the media 2 appears white to the user. Below, this state is referred to as the "reset state". The voltage $V_r$ is the previously mentioned reset voltage. It should be noted that when the reset voltage is higher than $V_{2u}$, there is no need to carry out photo irradiation. However, since a lower reset voltage is more desirable from the standpoint of safety and power consumption, it is worthwhile to carry out photo irradiation when placing the media 2 in a reset state.

When voltage application is stopped after photo irradiation in a state, in which a voltage $V_w$ (where $V_{1e}<V_w<V_{1u}$) is applied to the media 2 in a reset state, the cholesteric liquid crystals of the media 2 transition to an F-alignment and stabilize. On the other hand, when voltage application is stopped without photo irradiation in a state, in which the voltage $V_w$ is applied to the media 2, the cholesteric liquid crystals of the media 2 remain P-aligned. Accordingly, to the user, the portion subjected to photo irradiation during voltage application appears black and the portion that was not photo-irradiated appears white, as a result of which a black-and-white image is formed on the media 2. The voltage $V_w$ is the previously mentioned image formation voltage.

As described above, images are formed by carrying out selective photo irradiation while applying the image formation voltage to the media 2 in a reset state, and images are erased by carrying out uniform photo irradiation while applying the reset voltage to the media 2, on which the images are formed. In the image forming apparatus 1, due to the use of the above-described configuration, image erasure is performed while the photo-irradiating bar 12 moves from the left-hand side of FIG. 1 in the direction of arrow B1 and image formation is performed while the photo-irradiating bar 12 moves from the right-hand side of FIG. 1 in the direction of arrow B2.

It should be noted that the reset voltage and image formation voltage are not limited to the descriptions provided above. For instance, when voltage application is stopped within a short period of time after uniform photo irradiation in a state, in which a reset voltage not less than $V_{2u}$ is applied, all of the cholesteric liquid crystals of the media 2 transition to a P-alignment and stabilize. After rendering the entire surface white in this manner, the media 2 is selectively irradiated with light while applying an image formation voltage $V_r$ such that $V_{2e}<V_r<V_{2u}$. The cholesteric liquid crystals in the photo-irradiated portion transition to an H-alignment and then transition to a P-alignment, stabilize, and appear white. On the other hand the cholesteric liquid crystals in the portion that has not been photo-irradiated become F-aligned and appear black. In this manner, images may be formed on the media 2.

In the image forming apparatus 1, as described above, image formation and erasure are carried out when the photo-irradiating bar 12 irradiates the media 2 with light from the same side as the user relative to the media 2 loaded into the enclosure 11. For this reason, the user can easily visually confirm the formation and erasure of images. Moreover, multiple media 2 can be loaded into the enclosure 11 of the image forming apparatus 1 as a stack, such that the formation and erasure of images on the media 2 is performed on the medium located in the topmost position. Accordingly, even if multiple media 2 are loaded into the enclosure 11 as a stack, in the same manner as with a single medium 2, the user can easily visually confirm the formation and erasure of images. Furthermore, in the image forming apparatus 1, the media 2 is loaded in the enclosure 11 and does not move while the erasure and formation of images on the media 2 is carried out. Accordingly, the visual confirmation of image erasure and formation is not impeded by the motion of the media 2.

Moreover, in the image forming apparatus 1, as described above, image erasure is carried out while the photo-irradiating bar 12 moves in the direction of arrow B1 and image formation is carried out while it moves in the direction of arrow B2. Under the conventional technology, image erasure and formation are carried out concurrently while moving either the irradiating unit or the media so as to change the relative position of the media and the irradiating unit performing photo irradiation. In comparison with image forming apparatuses based on such conventional technology, the image forming apparatus 1 used in the exemplary embodiment of the present Application possesses the following advantages.

FIGS. 4A to 4I are diagrams illustrating the formation of a new image in parallel to erasing an old image formed on the media 2 by the photo-irradiating bar 92 of an image forming apparatus based on the conventional technology. In addition to an LED array 921, which selectively radiates image-bearing light in order to form new images, the photo-irradiating bar 92 has an LED array 922 used to erase old images and reset the media 2. The resetting LED array 922 is capable of photo irradiation over a wider range than the LED array 921. However, the LED array 922 does not have the condenser lenses that the LED array 921 has, and the intensity of its light per irradiated unit area of the media 2 is relatively weaker in comparison with that of the LED array 921. The photo-irradiating bar 92 moves in the direction of arrow B1 at a speed of "v". It should be noted that the photo-irradiating bar 92 is not provided with terminals for applying a voltage between the electrode 25 and sub-electrodes 241, with the sub-electrodes 241 and the electrode 25 being directly connected to a power supply unit for voltage application.

Figure 4A:
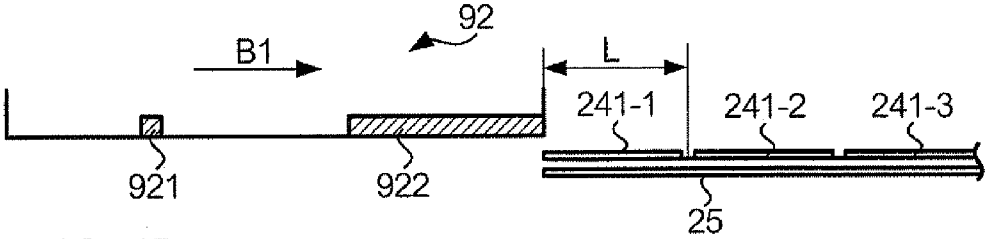
FIGS. 4A to 4I are diagrams used to explain the operation of an image forming apparatus based on the conventional technology.

Below, arrow B1 of FIGS. 4A to 4I is assumed to be a forward direction and the direction opposite to arrow B1 is assumed to be a rearward direction. FIG. 4A illustrates a state, in which the edge of the LED array 922 in the forward direction has reached the position of the edge of the sub-electrode 241-1 in the rearward direction. At the point in time illustrated in FIG. 4A, the region of the sub-electrode 241-1 is exposed to external light and image erasure, i.e. resetting, cannot be initiated.

Figure 4B:
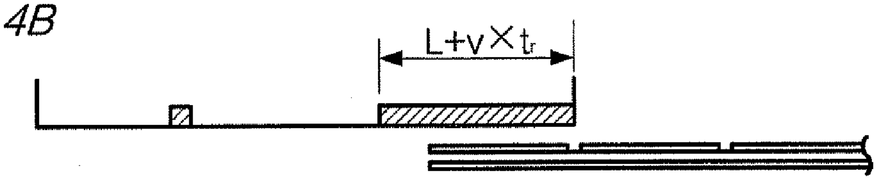

FIG. 4B illustrates a state, in which the edge of the LED array 922 in the forward direction has reached the position of the edge of the sub-electrode 241-1 in the forward direction. Since the entire surface of the region of the sub-electrode 241-1 is shielded by the photo-irradiating bar 92 at the point in time illustrated in FIG. 4B, the application of the reset voltage between the sub-electrode 241-1 and electrode 25 is initiated while simultaneously initiating photo irradiation using the LED array 922.

Since the light of the LED array 922 is weaker in comparison with the light of the LED array 921, the application of the reset voltage and photo irradiation of the sub-electrode 241-1 must continue for a reset time $t_r$ in order to properly reset the region of the sub-electrode 241-1. For this reason, the length of the LED array 922 in the direction of arrow B1 has to be obtained by adding $v \times t_r$ to the length L of the sub-electrodes 241, i.e. it must be $(L+v \times t_r)$.

Figure 4C:
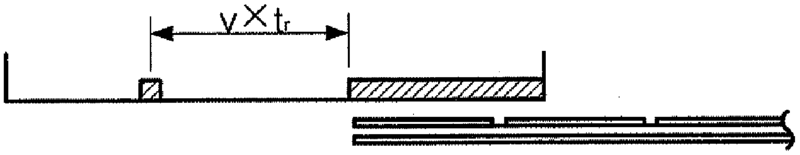

FIG. 4C illustrates a state, in which the edge of the LED array 922 in the rearward direction has reached the position of the edge of the sub-electrode 241-1 in the rearward direction. Since the resetting of the region of the sub-electrode 241-1 is finished at the point in time illustrated in FIG. 4C, the application of the reset voltage between the sub-electrode 241-1 and electrode 25 and photo irradiation using the LED array 922 are terminated.

Although the resetting of the region of the sub-electrode 241-1 is over at the moment in time illustrated in FIG. 4C, an interval of $t_i$ has to be provided between the completion of resetting and the start of image formation in order to allow the state of alignment of the cholesteric liquid crystals to stabilize. For this reason, the LED array 921 has to be located in a position rearwardly spaced by a distance of at least $v \times t_i$ from the edge of the LED array 922 in the rearward direction.

Figure 4D:

FIG. 4D illustrates a state, in which the edge of the LED array 922 in the forward direction has reached the position of the edge of the sub-electrode 241-2 in the forward direction. Since the entire surface of the region of the sub-electrode 241-2 is shielded by the photo-irradiating bar 92 at the point in time illustrated in FIG. 4D", the application of the reset voltage between the sub-electrode 241-2 and electrode 25 is initiated while simultaneously initiating photo irradiation using the LED array 922.

Figure 4E:

FIG. 4E illustrates a state, in which the edge of the LED array 922 in the rearward direction has reached the position of the edge of the sub-electrode 241-2 in the rearward direction. Since the resetting of the region of the sub-electrode 241-2 is finished at the point in time illustrated in FIG. 4E, the application of the reset voltage between the sub-electrode 241-2 and electrode 25 and photo irradiation using the LED array 922 are terminated.

Figure 4F:
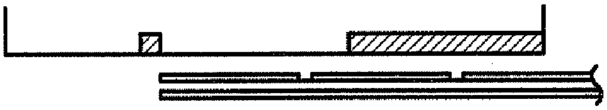

FIG. 4F illustrates a state, in which the LED array 921 has reached the position of the edge of the sub-electrode 241-1 in the rearward direction. At the point in time illustrated in FIG. 4F, the application of the image formation voltage is initiated between the sub-electrode 241-1 and electrode 25 while at the same time initiating selective photo irradiation with image bearing light by the LED array 921.

Figure 4G:
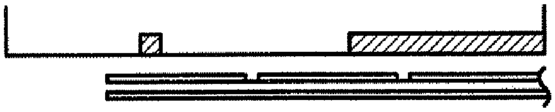

FIG. 4G illustrates a state, in which the edge of the LED array 922 in the forward direction has reached the position of the edge of the sub-electrode 241-3 in the forward direction. Since the entire surface of the region of the sub-electrode 241-3 is shielded by the photo-irradiating bar 92 at the point in time illustrated in FIG. 4G, the application of the reset voltage between the sub-electrode 241-3 and electrode 25 is initiated while simultaneously initiating photo irradiation using the LED array 922. It should be noted that the application of the image formation voltage between the sub-electrode 241-1 and electrode 25, as well as the photo irradiation by the LED array 921, are still being carried out at this point in time.

Figure 4H:
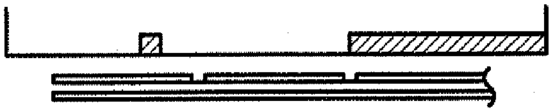

FIG. 4H illustrates a state, in which the edge of the LED array 922 in the rearward direction has reached the position of the edge of the sub-electrode 241-3 in the rearward direction. Since the resetting of the region of the sub-electrode 241-3 is finished at the point in time illustrated in FIG. 4H, the application of the reset voltage between the sub-electrode 241-3 and electrode 25 and photo irradiation using the LED array 922 are terminated. It should be noted that the application of the image formation voltage between the sub-electrode 241-1 and electrode 25, as well as the photo irradiation by the LED array 921, are still being carried out at this point in time.

Figure 4I:

FIG. 4I illustrates a state, in which the LED array 921 has reached the position of the edge of the sub-electrode 241-1 in the forward direction. Since the formation of images in the region of the sub-electrode 241-1 is finished at the point in time illustrated in FIG. 4I, the application of the image formation voltage between the sub-electrode 241-1 and electrode 25 is terminated. At the same time, since the LED array 921 has reached the edge of the sub-electrode 241-2 in the rearward direction, the application of the image formation voltage between the sub-electrode 241-2 and electrode 25 is initiated. It should be noted that the photo irradiation by the LED array 921 is continued. From this point on, the operation described above with reference to FIGS. 4A to 4I is repeated on the regions of the subsequent sub-electrodes 241.

It should be noted that the region of the sub-electrode 241-1 has to be shielded from external light by the photo-irradiating bar 92 until the formation of images in the region of the sub-electrode 241-1 is finished. Accordingly, the edge of the photo-irradiating bar 92 in the rearward direction has to by spaced at least by a distance of L from the position of the LED array 921. Therefore, the length of the photo-irradiating bar 92 in the direction of arrow B1 has to be at least $(2L+v\times t_r+v\times t_i)$.

Figure 5A:
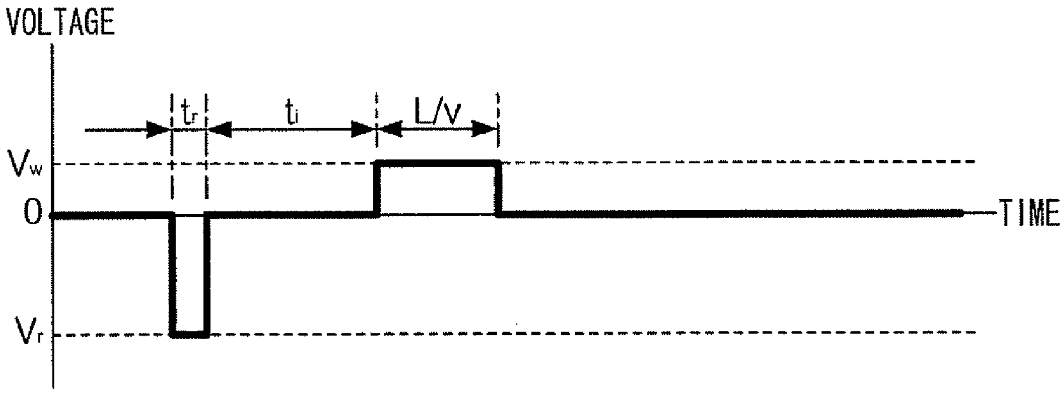
FIGS. 5A to 5C are diagrams used to explain the operation of an image forming apparatus based on the conventional technology.
Figure 5B:
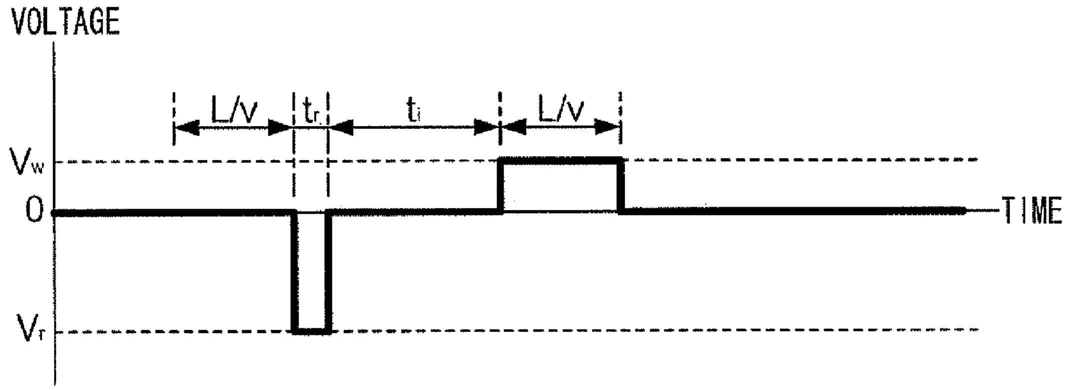
Figure 5C:
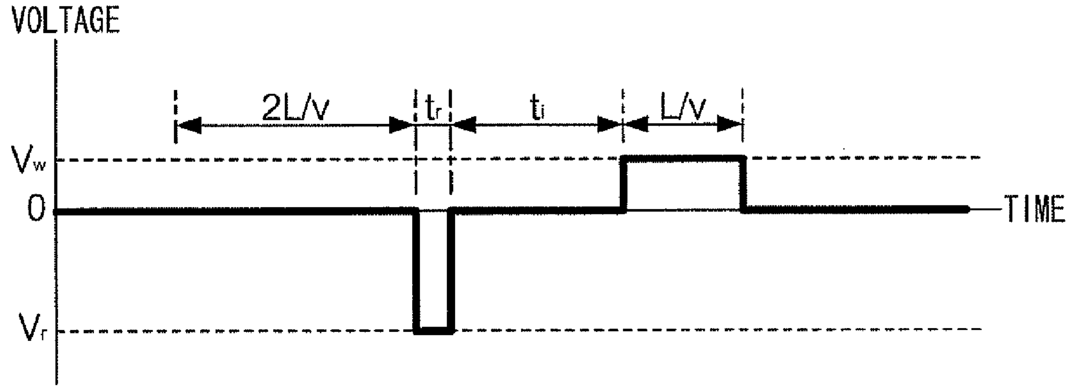

FIGS. 5A to 5C are graphs illustrating the relationship between time and voltage applied to the sub-electrode 241-1~sub-electrode 241-3 in an image forming apparatus based on the conventional technology, with the point in time illustrated in FIG. 4A used as the start point. FIGS. 5A to 5C correspond to the sub-electrode 241-1~sub-electrode 241-3. As shown in FIGS. 5A to 5C, when the reset voltage is applied to a sub-electrode 241, an image formation voltage is applied to another sub-electrode 241. Accordingly, in the image forming apparatus based on the conventional technology, different voltages have to be simultaneously applied to different sub-electrodes 241 (and the electrode 25 that faces them). For this reason, the image forming apparatus either has to comprise a power supply unit used for resetting and a power supply unit used for image formation, or it has to be provided with a circuit for converting a voltage supplied from a single power supply unit into different voltages and simultaneously applying them to a pair of different electrodes. Moreover, an even more complicated circuit configuration would be required under the conventional technology in order to make it possible for a power supply unit to apply a direct current voltage and switch its polarity during a reset operation and during image formation, as is done in the present exemplary embodiment using a single power supply unit 16.

By contrast, in the image forming apparatus 1 used in the exemplary embodiment of the present Application, the resetting of the media 2 is carried out while the photo-irradiating bar 12 moves in the direction of arrow B1 in FIG. 1 and image formation is performed while the photo-irradiating bar 12 moves from in the direction of arrow B2 of FIG. 1, so that resetting and image formation are not performed simultaneously. Accordingly, a single power supply unit 16 is used to apply a reset voltage during a reset operation and to apply an image formation voltage during image formation, which eliminates the need to provide the image forming apparatus 1 with different power supply units 16 for resetting and for image formation purposes or provide it with a circuit instead of the units.

Moreover, in the image forming apparatus 1, the resetting operation is performed while the head is being transported. In an image forming apparatus based on the conventional technology, a reset time period, separate from the head transport period, is required during image formation. However, in the image forming apparatus 1, no reset period is necessary during image formation and a time required for image formation can be shortened. Furthermore, in the image forming apparatus 1, with account taken only of the need for light shielding, the length of the photo-irradiating bar 12 in the auxiliary direction can be set to 2L. By contrast, as described above, the length of the photo-irradiating bar 92 under the conventional technology has to be at least $(2L+v\times t_r\times v\times t_i)$. In other words, in comparison with the conventional technology, the length of the photo-irradiating bar 12 of the image forming apparatus 1 in the auxiliary direction can be made as short as $(v\times t_r+v\times t_i)$. Moreover, as a result of the above, when the intervals are set to zero, the length of the photo-irradiating bar 12 in the auxiliary direction can be made as short as $(v\times t_r)$. An improvement in readability due to the light-shielding member (fewer portions that cannot be seen in shadows) and a smaller size for the transporting unit can be implemented as a result.

Figure 6A:
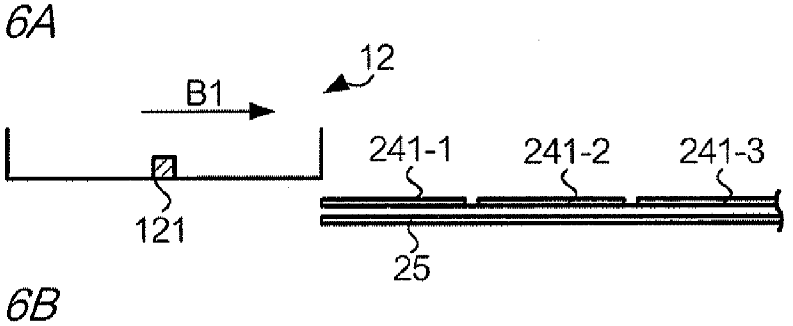
FIGS. 6A to 6I are diagrams used to explain the operation of the image forming apparatus in the exemplary embodiment of the present invention.

FIGS. 6A to 6I are diagrams illustrating the formation of a new image subsequent to erasure of an old image formed on the media 2 by the photo-irradiating bar 12 of the image forming apparatus 1. FIG. 6A illustrates a state, in which the edge of the photo-irradiating bar 12 in the forward direction has reached the position of the edge of the sub-electrode 241-1 in the rearward direction. At the point in time illustrated in FIG. 6A, the region of the sub-electrode 241-1 is exposed to external light and image erasure cannot be initiated.

Figure 6B:
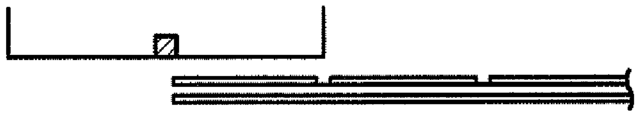

FIG. 6B illustrates a state, in which the LED array 121 has reached the position of the edge of the sub-electrode 241-1 in the rearward direction. Since the entire surface of the region of the sub-electrode 241-1 is shielded by the photo-irradiating bar 12 at the point in time illustrated in FIG. 6B, the application of the reset voltage between the sub-electrode 241-1 and electrode 25 is initiated while simultaneously initiating photo irradiation using the LED array 121.

Figure 6C:
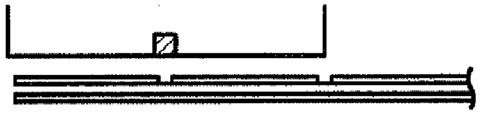
Figure 6D:
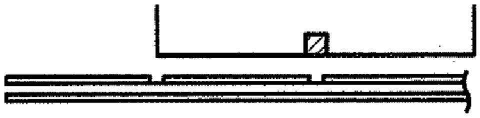
Figure 6E:

FIG. 6C illustrates a state, in which the LED array 121 has reached the position of the edge of the sub-electrode 241-1 in the forward direction. Since the resetting of the region of the sub-electrode 241-1 is finished at the point in time illustrated in FIG. 6C, the application of the reset voltage between the sub-electrode 241-1 and electrode 25 is terminated. Moreover, at the point in time illustrated in FIG. 6C, the application of the reset voltage between the sub-electrode 241-2 and electrode 25 is initiated because the LED array 121 has reached the edge of the sub-electrode 241-2 in the rearward direction. It should be noted that the photo irradiation by the LED array 121 is continued. After that, the above-described resetting operation is repeated on the subsequent sub-electrodes 241 (FIGS. 6D and 6E).

Figure 6F:
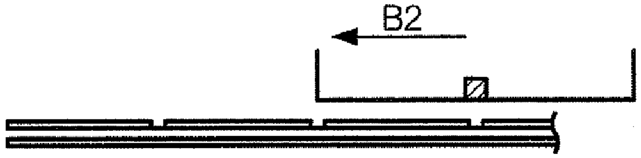

FIG. 6F illustrates a state, in which the LED array 121 has completed the resetting of all the sub-electrodes 241 and, while performing image formation, has been transported in the direction of arrow B2 until reaching the position of the edge of the sub-electrode 241-3 in the forward direction. At the point in time illustrated in FIG. 6F, the application of the image formation voltage is initiated between the sub-electrode 241-3 and electrode 25. The LED array 121 continues the previously conducted irradiation with image-bearing light.

Figure 6G:
Figure 6H:
Figure 6I:
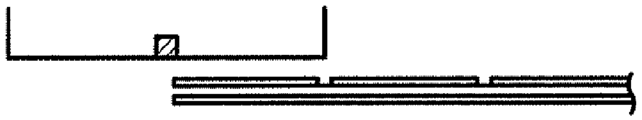

FIG. 6G illustrates a state, in which the LED array 121 has reached the edge of the sub-electrode 241-3 in the rearward direction and the edge of the sub-electrode 241-2 in the forward direction. At the point in time illustrated in FIG. 6G, the application of the image formation voltage between the sub-electrode 241-3 and electrode 25 is finished and, at the same time, the application of the image formation voltage between the sub-electrode 241-2 and electrode 25 is initiated. The LED array 121 continues the previously conducted irradiation with image-bearing light. After that, the above-described image formation operation is repeated on the subsequent sub-electrodes 241 (FIGS. 6H and 6I).

Figure 7A:
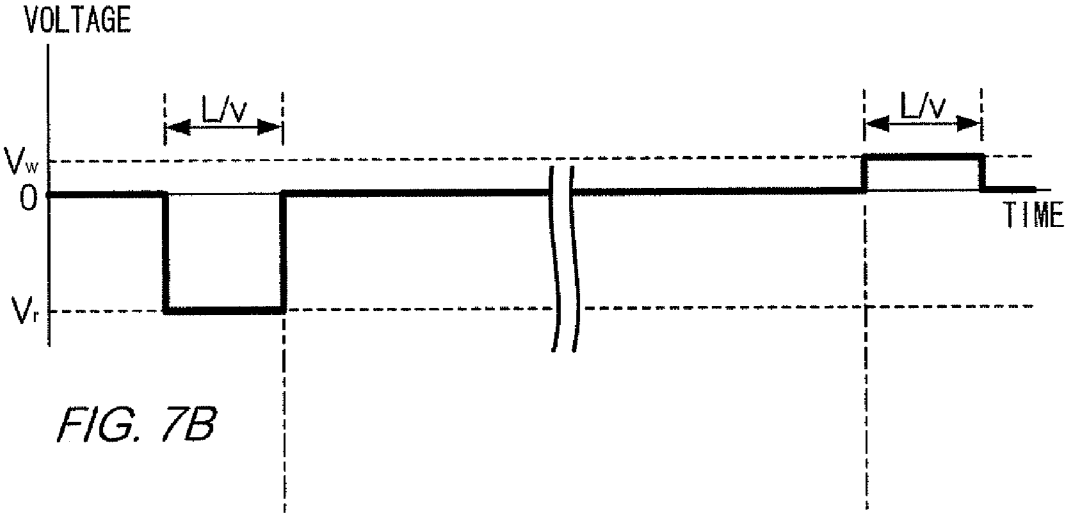
FIGS. 7A to 7C are diagrams used to explain the operation of the image forming apparatus in the exemplary embodiment of the present invention.
Figure 7B:
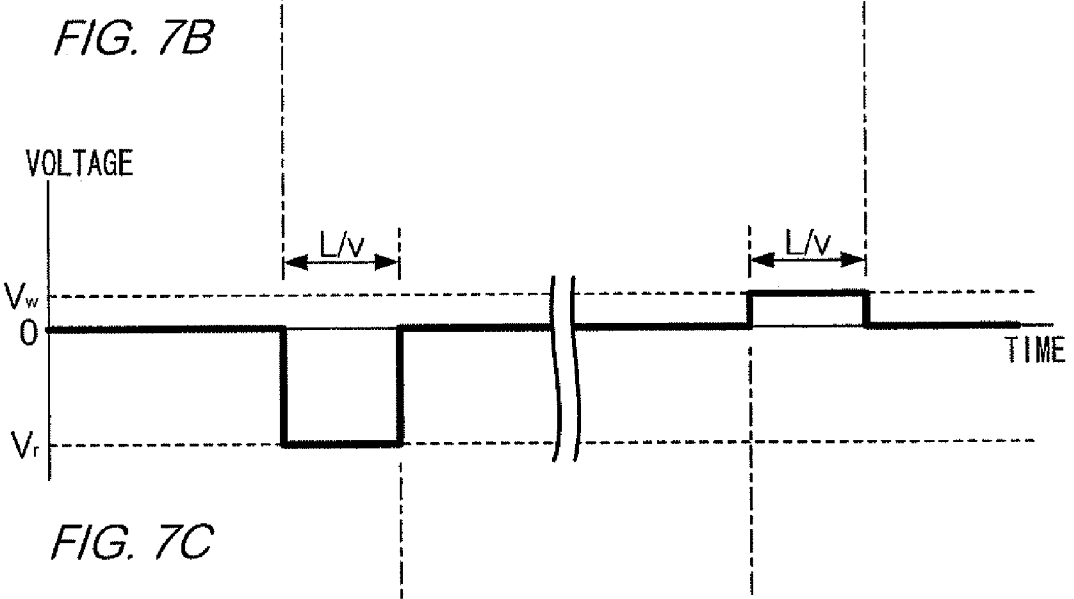
Figure 7C:
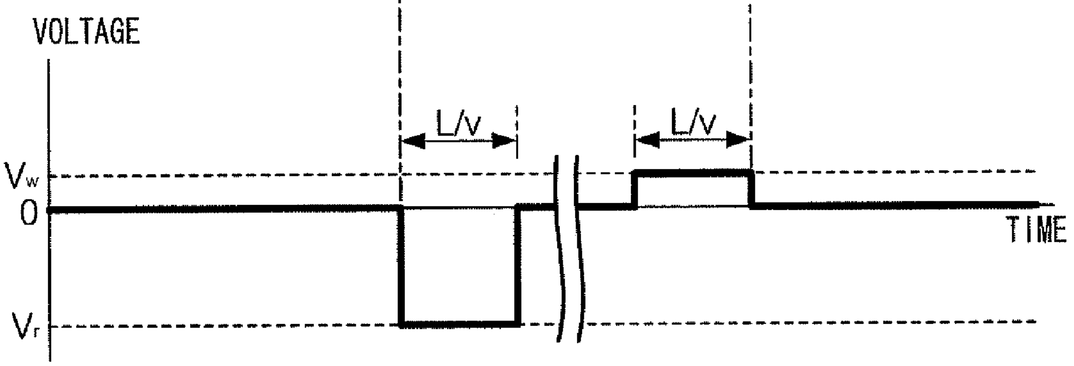

FIGS. 7A to 7C are graphs illustrating the relationship between time and voltage applied to the sub-electrode 241-1~sub-electrode 241-3 in the image forming apparatus 1, with the point in time illustrated in FIG. 6A used as the starting point. FIGS. 7A to 7C correspond to the sub-electrode 241-1~sub-electrode 241-3. As shown in FIGS. 7A to 7C, in the image forming apparatus 1, when the reset voltage is applied to a sub-electrode 241, an image formation voltage is applied to another sub-electrode 241. Therefore, there are no difficulties associated with using a single power supply unit 16 both for resetting and for image formation purposes. It should be noted that FIGS. 6A to 6I clearly show that in the image forming apparatus 1, the length of the photo-irradiating bar 12 in the auxiliary direction can be set to 2L.

2. Alternative Exemplary Embodiment

The above-described exemplary embodiments may be modified, for instance, in the following manner. In an alternative exemplary embodiment, the image forming apparatus 1 comprises a mechanism which, under the control of the control unit 15, varies the degree of aperture of the lenses the LED array 121. When the photo-irradiating bar 12 is transported in the direction of arrow B1 of FIG. 1, the image forming apparatus 1 of the alternative exemplary embodiment reduces the degree of aperture of the lenses of the LED array 121 in comparison with transportation in the direction of arrow B2. As a result, photo irradiation is performed over a wider range of the media 2 during a reset operation than during image formation. Accordingly, the media 2 obtained in the reset state has fewer irregularities than when the reset operation is performed using the same degree of aperture as during image formation.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a holding unit that holds a medium on which an image is formed by irradiation of image-bearing light, the medium having a liquid crystal layer, a photoconductor layer that changes a resistance in response to irradiation of light, and a pair of electrode layers provided in an opposing relation so as to sandwich the liquid crystal layer and photoconductor layer, with at least one of the pair of electrode layers being divided into a plurality of stripe-shaped sub-electrode layers;

an irradiating unit that irradiates, from a position opposite the holding unit with respect to the medium, the medium with image-bearing light linearly along a longitudinal direction of the plurality of sub-electrode layers of the medium held by the holding unit;

a transporting unit that transports the irradiating unit along the surface of the medium held by the holding unit in a first direction transverse to the longitudinal direction of the linear light radiated by the irradiating unit or in a second direction opposite to the first direction;

a power supply unit that, while the light radiated by the irradiating unit irradiates the photoconductor layer contacting one of the plurality of sub-electrode layers of the medium held by the holding unit, applies a voltage between the sub-electrode layer and the electrode layer positioned corresponding to the sub-electrode layer; and an optical shielding unit that, while the light radiated by the irradiating unit irradiates the photoconductor layer contacting one of the plurality of sub-electrode layers of the medium held by the holding unit, shields the photoconductor layer contacting said sub-electrode layer from external light, wherein the irradiating unit uniformly radiates light of a constant intensity while the irradiating unit is transported by the transporting unit in the first direction, and radiates image-bearing light while the irradiating unit is transported by the transporting unit in the second direction, and wherein the power supply unit applies a direct current voltage of a first polarity while the irradiating unit is transported by the transporting unit in the first direction and applies a direct current voltage of another polarity different from the first polarity while the irradiating unit is transported by the transporting unit in the second direction.

2. The image forming apparatus according to claim 1, wherein the power supply unit changes the magnitude of the applied voltage depending on which of the first and second directions the irradiating unit is transported in by the transporting unit.

3. The image forming apparatus according to claim 1, wherein the irradiating unit is capable of changing a degree of aperture of the radiated light and, when the irradiating unit is transported by the transporting unit in the first direction, radiates light with a lower degree of aperture than when the irradiating unit is transported by the transporting unit in the second direction.

4. The image forming apparatus according to claim 2, wherein the irradiating unit uniformly radiates light of a constant intensity while the irradiating unit is transported by the transporting unit in the first direction, and radiates image-bearing light while the irradiating unit is transported by the transporting unit in the second direction.

5. An image forming apparatus comprising:

a holding unit that holds a medium on which an image is formed by irradiation of image-bearing light, the medium having a liquid crystal layer, a photoconductor layer that changes a resistance in response to irradiation of light, and a pair of electrode layers provided in an opposing relation so as to sandwich the liquid crystal layer and photoconductor layer, with at least one of the pair of electrode layers being divided into a plurality of stripe-shaped sub-electrode layers;

an irradiating unit that irradiates, from a position opposite the holding unit with respect to the medium, the medium with image-bearing light linearly along a longitudinal direction of the plurality of sub-electrode layers of the medium held by the holding unit;

a transporting unit that transports the irradiating unit along the surface of the medium held by the holding unit in a first direction transverse to the longitudinal direction of the linear light radiated by the irradiating unit or in a second direction opposite to the first direction;

a power supply unit that, while the light radiated by the irradiating unit irradiates the photoconductor layer contacting one of the plurality of sub-electrode layers of the medium held by the holding unit, applies a voltage between the sub-electrode layer and the electrode layer positioned corresponding to the sub-electrode layer; and an optical shielding unit that, while the light radiated by the irradiating unit irradiates the photoconductor layer contacting one of the plurality of sub-electrode layers of the medium held by the holding unit, shields the photoconductor layer contacting said sub-electrode layer from external light, wherein the irradiating unit uniformly radiates light of a constant intensity while the irradiating unit is transported by the transporting unit in the first direction, and radiates image-bearing light while the irradiating unit is transported by the transporting unit in the second direction, and wherein the irradiating unit is capable of changing a degree of aperture of the radiated light and, when the irradiating unit is transported by the transporting unit in the first direction, radiates light with a lower degree of aperture than when the irradiating unit is transported by the transporting unit in the second direction.

6. The image forming apparatus according to claim 5, wherein the power supply unit changes the magnitude of the applied voltage depending on which of the first and second directions the irradiating unit is transported in by the transporting unit.

7. The image forming apparatus according to claim 6, wherein the irradiating unit uniformly radiates light of a constant intensity while the irradiating unit is transported by the transporting unit in the first direction, and radiates image-bearing light while the irradiating unit is transported by the transporting unit in the second direction.

8. The image forming apparatus according to claim 5, wherein the power supply unit applies a direct current voltage of a first polarity while the irradiating unit is transported by the transporting unit in the first direction and applies a direct current voltage of another polarity different from the first polarity while the irradiating unit is transported by the transporting unit in the second direction.

* * * * *